(12) United States Patent
Tsujimura et al.

(10) Patent No.: US 7,458,557 B2
(45) Date of Patent: Dec. 2, 2008

(54) ELECTROMAGNETIC VALVE

(75) Inventors: Shinichi Tsujimura, Kariya (JP);
Masuhiro Kondo, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 199 days.

(21) Appl. No.: 11/511,251

(22) Filed: Aug. 29, 2006

(65) Prior Publication Data
US 2007/0051839 A1    Mar. 8, 2007

(30) Foreign Application Priority Data
Sep. 2, 2005    (JP) ............................... 2005-254874
Jun. 9, 2006    (JP) ............................... 2006-161081

(51) Int. Cl.
*F16K 31/02* (2006.01)
(52) U.S. Cl. .................................. 251/129.15; 335/299
(58) Field of Classification Search ............ 251/129.15; 335/299
See application file for complete search history.

(56) References Cited

U.S. PATENT DOCUMENTS

| 5,145,149 | A  | * | 9/1992 | Moehle ................. 251/129.15 |
| 6,390,445 | B2 | * | 5/2002 | Fukano ................. 251/129.19 |
| 6,612,543 | B2 | * | 9/2003 | Strobel ................. 251/129.15 |
| 6,731,192 | B1 | * | 5/2004 | Moreno et al. ............... 335/256 |
| 6,994,234 | B2 | * | 2/2006 | de Leeuw ................... 222/504 |

FOREIGN PATENT DOCUMENTS

JP    Y2-2539141    4/1997

* cited by examiner

*Primary Examiner*—John K. Fristoe, Jr.
(74) *Attorney, Agent, or Firm*—Posz Law Group, PLC

(57) ABSTRACT

A projection is provided in a flange of a resin spool, and a concave portion is provided in a yoke in a position facing the projection. The movement of the spool in the radial direction of the spool is restricted by inserting the projection into the concave portion. Because the inner circumferential surface of the concave portion and the outer circumferential surface of the projection are brought into contact, the movement of the spool in the axial direction of the spool is inhibited by frictional resistance at the points of contact.

12 Claims, 6 Drawing Sheets

ELECTROMAGNETIC VALVE

CROSS REFERENCE TO RELATED APPLICATION

This application is based upon and claims the benefit of Japanese Patent Application No. 2005-254874 filed on Sep. 2, 2005 and No. 2006-161081 filed on Jun. 9, 2006, the content of which are incorporated herein by reference.

FIELD OF THE INVENTION

The present invention relates to an electromagnetic valve that is suitable to be used, for example, in an actuator for an anti-lock brake system (ABS) for avoiding lock tendency of a wheel.

BACKGROUND OF THE INVENTION

A conventional electromagnetic valve is provided with a projection on an axial-direction end face of a coil that is sealed in resin. The resin-sealed coil is accommodated in a space that is formed by a magnetic material case (corresponding to a magnetic path member) and a magnetic lid-shaped body (corresponding to a magnetic path member), so that the projection is deformed and contacts with a flat face of the magnetic lid-shaped body. Contacting the projection with the magnetic lid-shaped body prevents the resin-sealed coil from vibrating on the magnetic material case and the magnetic lid-shaped body (see Japanese Utility Model Registration No. 2539141).

However, in the electromagnetic valve described in Japanese Utility Model Registration No. 2539141, a gap is formed between the projection and the magnetic lid-shaped body as a result of creep or temperature changes, so that vibration causes the resin-sealed coil to shake. The vibrating causes problems such as noise or the breaking of junctions between a terminal and a winding of the resin-sealed coil, for example.

SUMMARY OF THE INVENTION

In light of the problems described above, it is an object of the present invention to provide an electromagnetic valve that can inhibit vibrating that results from vibration.

According to a first aspect of the present invention, a projection is provided on a flange of a resin spool, on an axial-direction end face of the spool. A concave portion that faces the projection is provided on a metal magnetic path member. The projection is accommodated in the concave portion such that the outer circumferential surface of the projection touches the inner circumferential surface of the concave portion.

Because the projection is accommodated in the concave portion, the movement of the spool in the radial direction of the spool is restricted, making it possible to prevent the spool and a coil from vibrating in the radial direction of the spool. Further, since the inner circumferential surface of the concave portion and the outer circumferential surface of the projection are in contact with each other, the movement of the spool in the axial direction of the spool is inhibited by frictional resistance at the points of contact, making it possible to inhibit vibrating of the spool and the coil in the axial direction of the spool.

According to a second aspect of the present invention, plural projections are provided as the projection and plural concave portions are provided as the concave portion.

In this configuration, since the plural projections and the plural concave portions are provided, the difference in the linear expansion coefficients of the resin spool and the metal magnetic path member is generated. Thus, an amount of dimensional change between respective projections due to a change in temperature will be different from that between the concave portions due to a change in temperature. Therefore, at least one location between the outer circumferential surfaces of the projections and the inner circumferential surfaces of the concave portions is maintained in a contact state, regardless of the temperature. This makes it possible to reliably obtain the effects of the first aspect.

According to a third aspect of the present invention, a portion of the projection plastically deforms and is fitted into the concave portion.

Because a portion of the projection deforms plastically and is fitted into the concave portion, a portion of the projection inserts into the concave portion so that the movement of the spool in the radial direction of the spool is reliably restricted. In the portion of the projection that is positioned outside the concave portion and is pressed by the magnetic path member, that is, a portion at which a compressive load is applied, deformation occurs due to creep, and temperature changes tend to make a gap between the spool and the magnetic path member. However, regarding the portion of the projection that is inserted in the concave portion, the compressive load is not applied thereto and dimensional changes due to creep tend not to occur, so it is possible for the outer circumferential surface of the projection and the inner circumferential surface of the concave portion to remain continuously in the contact state.

According to a fourth aspect of the present invention, the magnetic path member is a yoke shaped into a square letter C when viewed from the radial direction of the spool. The yoke is provided with two parallel yoke arms, which are positioned at both ends of the spool in the axial direction of the spool and sandwich the spool, and a yoke side plate for connecting the two yoke arms. The yoke is structured such that the spool is inserted into an opening in the yoke that is on an opposite side of the yoke from the yoke side plate toward the yoke side plate and is sandwiched between the two yoke arms. The two yoke arms are provided with through-holes that are coaxial with the cylindrical portion. At least one of the two yoke arms is provided with a concave portion.

This configuration makes it easy to assemble the yoke and the spool into a valve, because axial centers of the through-holes and the cylindrical portion of the spool can be precisely aligned by inserting the projection in the spool into the concave portion in the yoke arm.

According to a fifth aspect of the present invention, at least a portion of the projection is positioned at a location in the flange that is farther outside in the radial direction of the spool than an outermost perimeter of the coil.

In this arrangement, the portion of the flange that is positioned at the outside of the outermost perimeter of the coil in the radial direction of the spool can easily be deformed toward the coil in the axial direction of the spool. Therefore, the frictional resistance between a tip of the projection and the surface of the yoke when the spool is inserted into the yoke is reduced, making it possible to inhibit abrasion of the projection.

According to a sixth aspect of the present invention, the concave portion is positioned to the outside of the through-hole in a direction that is orthogonal to both the spool insertion direction and the axial direction of the spool.

In this arrangement, when the spool is inserted into the yoke, the projection is able to reach the concave portion while avoiding the through-hole, making it possible to prevent abrasion of the projection by an edge of the through-hole.

According to a seventh aspect of the present invention, the concave portion that is positioned closer to the yoke side plate than a center of the through-hole is positioned at the outside of the through-hole in a direction that is orthogonal to both the spool insertion direction and the axial direction of the spool.

Because of this arrangement, when the spool is inserted into the yoke, it is possible to prevent the edge of the through-hole from abrading the projection that reaches a side of the yoke side plate while avoiding the through-hole.

According to an eighth aspect of the present invention, a plurality of concave portions are provided along the spool insertion direction, and the respective positions of the plurality of concave portions are offset in a direction that is orthogonal to both the spool insertion direction and the axial direction of the spool.

In this arrangement, when the spool is inserted into the yoke, the projection that is inserted into the concave portion on the side of the yoke side plate is able to reach the side of the plate side concave portion while avoiding concave on an opening side of the yoke, making it possible to prevent abrasion of the projection by an edge of the concave of the opening side of the yoke.

According to a ninth aspect of the present invention, the plural concave portions on the opening side of the yoke are positioned to the inside of the plural concave portions on the side of the yoke side plate in a direction that is orthogonal to both the spool insertion direction and the axial direction of the spool. As a result, a tip of the yoke can easily be made narrower.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
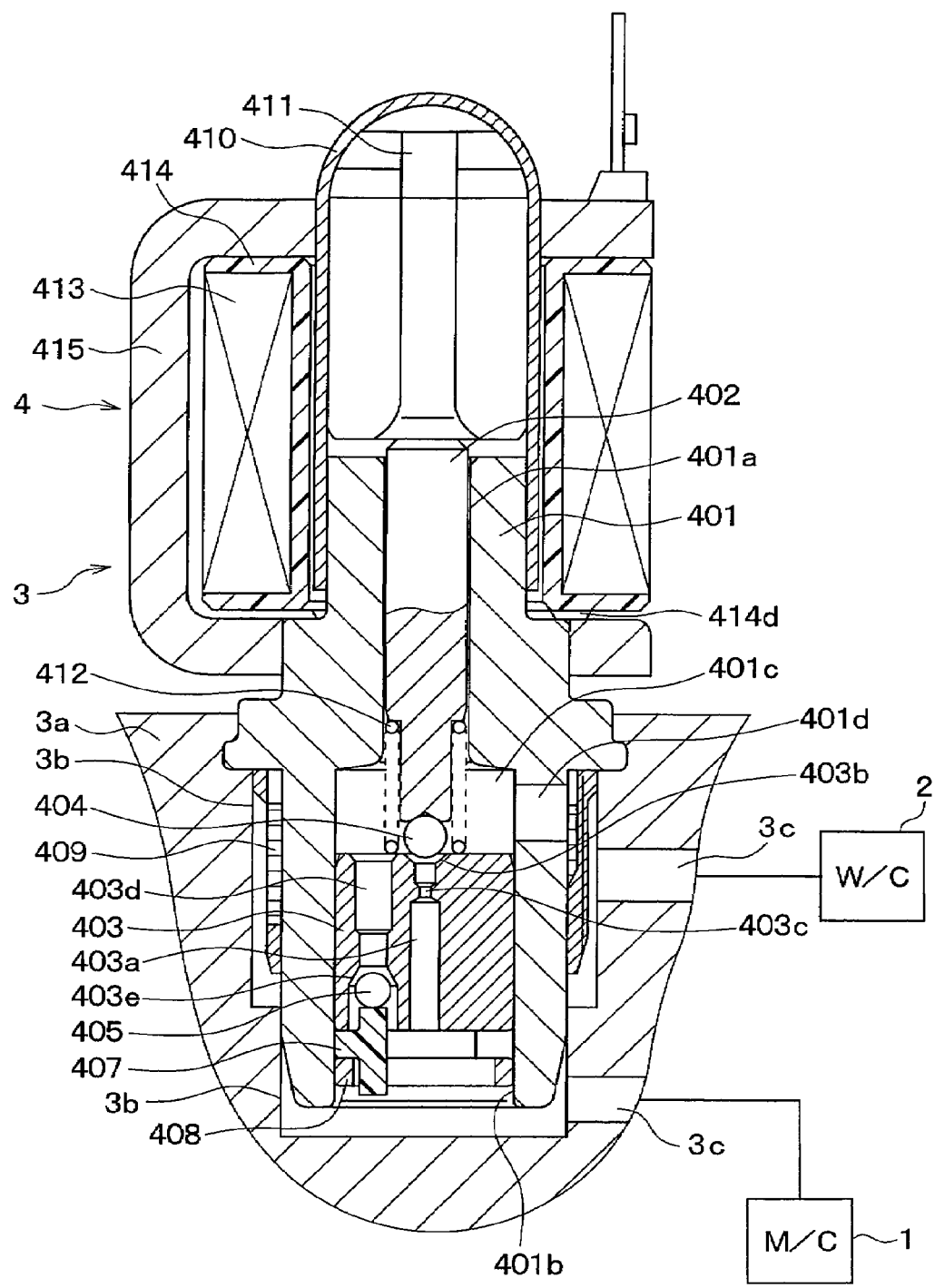
FIG. 1 is a cross sectional view showing an electromagnetic valve of a first embodiment of the present invention in its assembled state inside an actuator housing.

The present invention will be described further with reference to various embodiments in the drawings.

First Embodiment

A first embodiment of the present invention will now be explained. FIG. 1 is a cross sectional view showing an electromagnetic valve in accordance with the first embodiment of the present invention in its assembled state inside an actuator housing.

As shown in FIG. 1, a fluid pressure control actuator 3 is located between a master cylinder (hereafter referred to as M/C) 1 and a wheel cylinder (hereafter referred to as W/C.) 2. The fluid pressure control actuator 3 is provided with an aluminum alloy housing 3a. A recessed portion 3b and flow channels 3c are formed in the housing 3a. The recessed portion 3b is formed in a stepped cylindrical shape, into which an electromagnetic valve 4 is inserted. The flow channels 3c are formed to allow brake fluid to flow between the M/C 1 and the W/C 2.

The electromagnetic valve 4 is provided with a guide 401 that is formed in a stepped cylindrical shape. The guide 401 is formed from a magnetic material. One end of the guide 401 is inserted into the recessed portion 3b of the housing 3a, and the other end protrudes to the outside of the housing 3a. An opening end portion of the recessed portion 3b is caulked, so that the guide 401 is fixed to the housing 3a.

A guide hole 401a, which holds a shaft 402 such that it can slide freely, a seat insertion hole 401b, into which a seat 403 is press-fitted, a space 401c, which is enclosed by the seat 403 and the seat insertion hole 401b, and a through-hole 401d, which allows the space 401c to communicate with the flow channel 3c on the W/C 2 side, are formed in the guide 401.

The shaft 402, which is cylindrical, is formed from a non-magnetic metal (for example, stainless steel) and protrudes from the guide hole 401a at the end of the guide 401 toward the seat 403, extending into the space 401c. A spherical main valve body 404 made of metal is welded to a tip of the shaft 402.

The seat 403 is cylindrical and made of metal. A main flow channel 403a, which allows the space 401c inside the guide 401 to communicate with the flow channel 3c on the M/C 1 side, is formed in the radial center of the seat 403. A tapered main valve seat 403b, with which the main valve body 404 comes into contact and from which the main valve body 404 separates, is formed at the end of the main flow channel 403a toward the space 401c. A restriction 403c, which has a smaller cross-sectional area than the main flow channel 403a, is formed within the main flow channel 403a. The main flow channel 403a is closed when the main valve body 404 comes into contact with the main valve seat 403b and is opened when the main valve body 404 separates from the main valve seat 403b.

A secondary flow channel 403d, which is parallel to the main flow channel 403a and allows the space 401c inside the guide 401 to communicate with the flow channel 3c on the M/C 1 side, is formed in a location where is shifted from the radial center of the seat 403. In other words, the secondary flow channel 403d is acting as a bypass of the main flow channel 403a to connect the flow channel 3c on the M/C 1 side to the flow channel 3c on the W/C 2 side.

A tapered secondary valve seat 403e is formed within the secondary flow channel 403d. A spherical secondary valve body 405 made of metal is inserted into the secondary flow channel 403d on the side of the secondary valve seat 403e that is closer to the flow channel 3c on the M/C 1 side in such a way that the secondary valve body 405 can move. The secondary flow channel 403d is closed when the secondary valve body 405 comes into contact with the secondary valve seat 403e as the secondary valve body 405 and is opened when the action of the secondary valve body 405 separates from the secondary valve seat 403e based on a difference in pressure.

A filter 407 for preventing the entry of foreign matter is inserted into the opening end portion of the seat insertion hole 401b in the guide 401. A metal ring 408 is also press-fitted into the opening end portion of the seat insertion hole 401b to prevent the filter 407 from falling out. The filter 407 also defines the open position of the secondary valve body 405. A filter 409 for preventing the entry of foreign matter is located around the outer circumference of the guide 401 so as to enclose the through-hole 401d.

A sleeve 410 is fitted around the outer circumference of the other end of the guide 401. The sleeve 410 is formed from a non-magnetic metal (for example, stainless steel). One end of the sleeve 410 is open, so that the sleeve 410 forms a cup shape, with the bottom surface of the cup shape formed into an approximately spherical shape.

An approximately cylindrical plunger 411 made of a magnetic material is located on the bottom surface end of the sleeve 410 such that the plunger 411 is able to slide within the sleeve 410. Note that the sliding of the plunger 411 in an upward direction in FIG. 1 is restricted by contacting the plunger 411 with the bottom surface of the sleeve 410.

A spring 412, which is disposed between the shaft 402 and the seat 403, urges the shaft 402 in the direction of the plunger 411 such that the shaft 402 and the plunger 411 are constantly in contact and integrally operated together.

A spool 414 wound with a coil 413 is located around the circumference of the sleeve 410. The coil 413 forms a magnetic field when electric power is supplied thereto. A yoke 415 acting as a magnetic path member is disposed around the outer circumference of the spool 414.

Incidentally, the electromagnetic valve 4 is roughly classified to a driving portion for driving the main valve body 404 of a valve portion and the valve portion for opening and closing the flow channels 3c in the housing 3a. The driving portion is made up of the coil 413, the spool 414 and the yoke 415. The valve portion is made up of all parts configured of the electromagnetic valve 4 other than the driving portion. The valve portion is press-fitted into the housing 3a and fixed, after which the driving portion is mounted on the valve portion.

Next, the basic operation of the electromagnetic valve 4 that is configured as described above will be explained. When electric power is not supplied to the electromagnetic valve 4, the shaft 402 and the plunger 411 are urged by the spring 412 toward the bottom surface end of the sleeve 410 such that the plunger 411 is in contact with the bottom surface of the sleeve 410. Also, the main valve body 404 of the shaft 402 separates from the main valve seat 403b of the seat 403, so that the flow channel 3c on the M/C 1 side and the flow channel 3c on the W/C 2 side are being communicative state via the main flow channel 403a of the seat 403, the space 401c within the guide 401, and the through-hole 401d in the guide 401.

If a brake pedal, which is not shown in FIG. 1, is depressed under these conditions, the pressure difference between the M/C 1 side and the W/C 2 side causes the secondary valve body 405 to move toward the secondary valve seat 403e of the seat 403. When the secondary valve body 405 comes into contact with the secondary valve seat 403e, the secondary flow channel 403d of the seat 403 is closed. Therefore, when the brake pedal is depressed, regarding the main flow channel 403a and the secondary flow channel 403d of the seat 403, the brake fluid flows from the M/C 1 side to the W/C 2 side only through the main flow channel 403a.

On the other hand, when the depressing of the brake pedal is discontinued, the pressure difference between the M/C 1 side and the W/C 2 side causes the secondary valve body 405 to move such that it separates from the secondary valve seat 403e of the seat 403. The flow channel 3c on the M/C 1 side and the flow channel 3c on the W/C 2 side are thus being communicative state via the secondary flow channel 403d of the seat 403, the space 401c within the guide 401, and the through-hole 401d in the guide 401. Therefore, when the depressing of the brake pedal is discontinued, the brake fluid quickly returns from the W/C 2 side to the M/C 1 side through both the main flow channel 403a and the secondary flow channel 403d of the seat 403.

When electric power is supplied to the electromagnetic valve 4, the shaft 402 and the plunger 411 are driven by electromagnetic force toward the seat 403. When the main valve body 404 comes into contact with the main valve seat 403b, the main flow channel 403a is closed.

Figure 2:
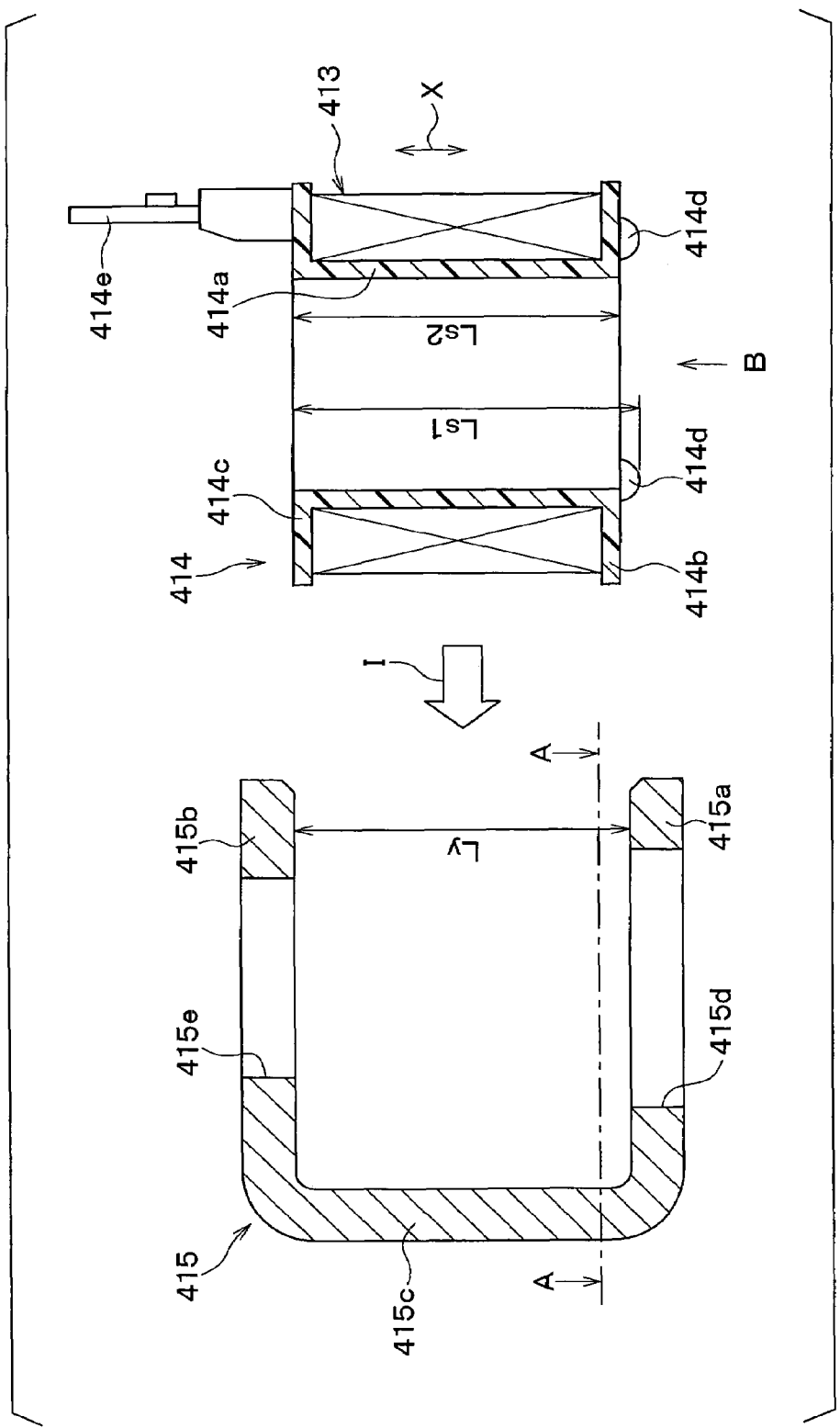
FIG. 2 is a cross sectional view showing a driving portion of the electromagnetic valve in FIG. 1 in a disassembled state.
Figure 3:
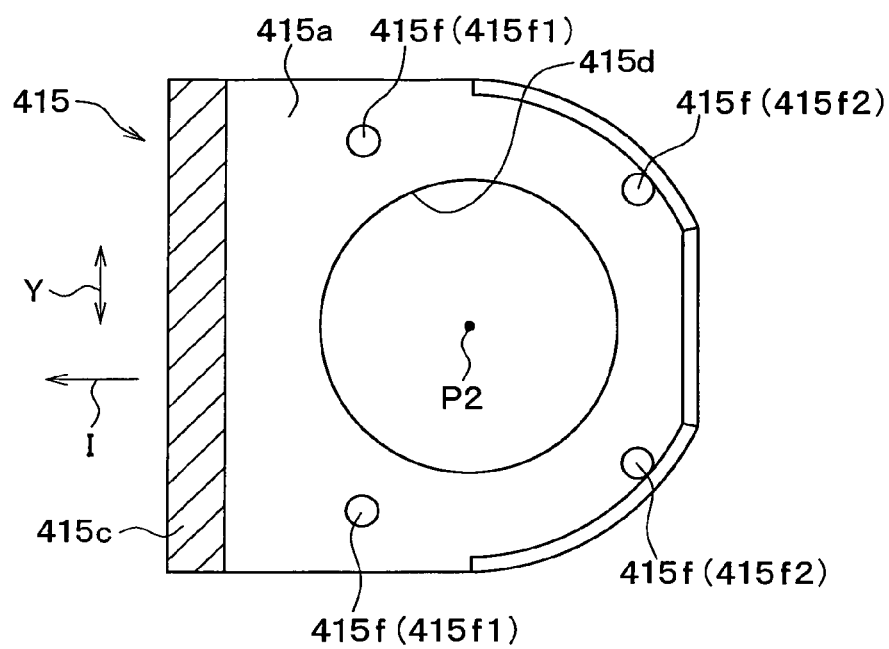
FIG. 3 is a cross sectional view taken along the A-A line in FIG. 2.
Figure 4:
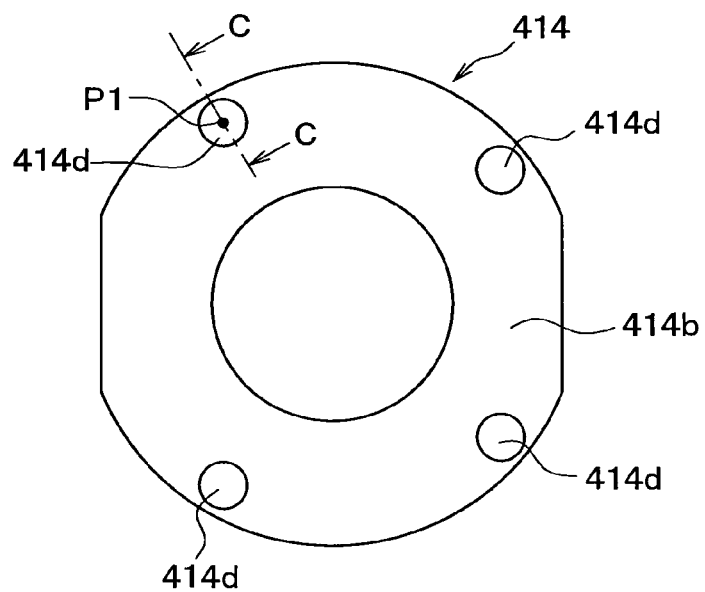
FIG. 4 is a base view viewed from the direction of arrow B in FIG. 2.
Figure 5:
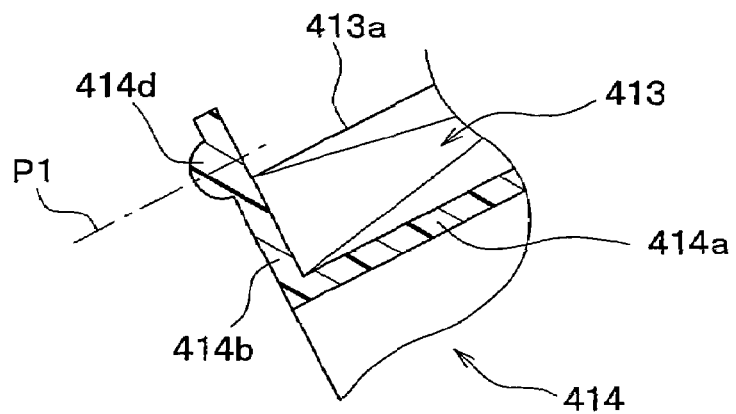
FIG. 5 is a cross sectional view taken along the C-C line in FIG. 4.
Figure 6:
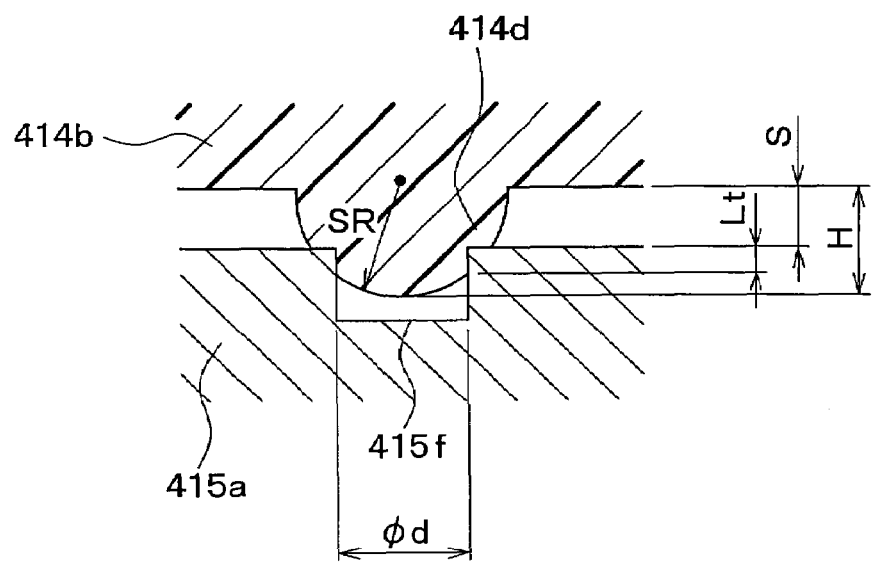
FIG. 6 is an enlarged cross sectional view of a location where a projection of a spool in the electromagnetic valve in FIG. 1 is fitted into a recessed portion of a yoke.

Next, the driving portion, which is made up of the coil 413, the spool 414, and the yoke 415, will be explained in detail, with reference to FIGS. 1 to 6. FIG. 2 is a cross sectional view that shows the driving portion disassembled into the coil 413, the spool 414, and the yoke 415. FIG. 3 is a cross sectional view taken along the A-A line in FIG. 2. FIG. 4 is a base view viewed from the direction of arrow B in FIG. 2. FIG. 5 is a cross sectional view taken along the C-C line in FIG. 4. FIG. 6 is an enlarged cross sectional view of a location where a projection of the spool, described later, is fitted into a recessed portion of the yoke 415.

As shown in FIGS. 1 to 6, the spool 414 is formed from a resin such as glass fiber filled nylon or the like. First and second flanges 414b, 414c extend radially outward from both ends of a cylindrical portion 414a.

Four projections 414d that protrude toward the housing 3a are provided on an axial-direction (X) end face of the spool 414 that is formed on the side of the first flange 414b that faces the housing 3a. Each of the projections 414d is shaped so that its diameter becomes smaller toward a tip thereof, or more specifically, so as to have a spherical shape. Moreover, each position of each of the projections 414d is farther outside in the radial direction of the spool than an outermost perimeter 413a of the coil 413. (See FIG. 5.) More specifically, when the spool 414 is viewed from the axial direction X, a center P1 of each projection 414d is positioned farther outside in the radial direction of the spool than the outermost perimeter 413a of the coil 413.

A terminal 414e, which is made of conductive metal, is inserted into the second flange 414c on the end away from the housing 3a. The terminal 414e protrudes from the second flange 414c in the direction away from the housing 3a. An end of a winding of the coil 413 is connected by fusing to the protruding portion.

The yoke 415 is made by press-forming a magnetic metal such as electrogalvanized steel plate (SECE) or the like. The yoke 415 includes two parallel yoke arms 415a, 415b, which are positioned respectively at either axial-direction (X) end of the spool 414, and a yoke side plate 415c that connects the two yoke arms 415a, 415b. The yoke 415 is thus shaped like a square letter C when viewed from the radial direction of the spool.

The spool 414 is inserted into an opening of the yoke 415 that is on the opposite side of the yoke 415 from the yoke side plate 415c such that the spool 414 moves toward the yoke side plate 415c, as indicated by the arrow I (hereafter called the spool insertion direction) in FIG. 2. The spool 414 is thus sandwiched between the two yoke arms 415a, 415b.

A first through-hole 415d is formed in the first yoke arm 415a on the side toward the housing 3a, and a second through-hole 415e is formed in the second yoke arm 415b on the side away from the housing 3a. The second through-hole 415e has a smaller diameter than and is coaxial with the first through-hole 415d. Four circular concave portions 415f are provided on the first yoke arm 415a at positions that face the projections 414d on the spool 414.

As shown in FIG. 3, the concave portions 415f are shifted in a direction Y that is orthogonal to both the spool insertion direction I and the axial direction X. Of the four concave portions 415f, concave portions 415f1 (hereafter called plate side concave portions 415f1) are positioned closer to the yoke side plate 415c than is a center P2 of the first through-hole 415d and are positioned to the outside of the first through-hole 415d in the direction Y.

Of the four concave portions 415f, concave. portions 415f2 (hereafter called yoke opening side concave portions 415f2) are positioned farther from the yoke side plate 415c than is the center P2 of the first through-hole 415d and are positioned to the inside of the plate side concave portions 415f1 in the direction Y.

As described above, each projection 414d has a spherical shape, and the outside diameter of the largest-diameter portion of each projection 414d is larger than the inside diameter of each concave portion 415f. Moreover, an axial-direction length Ls1 of the spool 414, which includes the projections 414d, is longer than a length Ly between the two yoke arms 415a, 415b. In contrast, an axial-direction length Ls2 of the spool 414, which does not include the projections 414d, is shorter than the length Ly between the two yoke arms 415a, 415b. Because of this dimensional relationship, when the spool 414 is sandwiched between the two yoke arms 415a, 415b, a portion of each projection 414d touches an edge of the corresponding concave portion 415f in the yoke 415 and plastically deforms, as shown in FIG. 6, so that the projection 414d is fitted into the concave portion 415f.

In this embodiment, an inside diameter d of each concave portion 415f is 1 mm, a radius of curvature SR of each projection 414d is 0.8 mm, a height H of each projection 414d is 0.7 mm, and a gap S between the first flange 414b and the first yoke arm 415a (that is, the difference between the length Ly and the length Ls2) is 0.3 mm. In this case, a length Lt of a portion where an inner circumferential surface of each concave portion 415f and an outer circumferential surface of a corresponding projection 414d are in contact is approximately 0.22 mm.

Next, the assembling of the coil 413, the spool 414, and the yoke 415 will be explained. First, the winding of the coil 413 is wound around the spool 414 to create a coil assembly. Next, the spool 414, which is united with the coil 413, is moved in the spool insertion direction I and inserted between the two yoke arms 415a, 415b.

When the spool 414 is inserted to a position where the cylindrical portion 414a of the spool 414 is approximately coaxial with the first and second through-holes 415d, 415e of the yoke 415, the positions of the four projections 414d are aligned with the positions of the four concave portions 415f. As shown in FIG. 6, a portion of each projection 414d touches an edge of the corresponding concave portion 415f in the yoke 415 and deforms plastically, so that the projection 414d is fitted into the concave portion 415f. In this manner, the coil 413, the spool 414, and the yoke 415 are integrally formed, and the driving portion is completed.

In this embodiment, the portion of the first flange 414b that is positioned to the outside of the outermost perimeter 413a of the coil 413 in the radial direction of the spool can easily be deformed toward the coil 413 in the axial direction X of the spool 414. Moreover, a portion of each projection 414d is also positioned to the outside of the outermost perimeter 413a of the coil 413 in the radial direction of the spool. Therefore, when the spool 414 is inserted between the yoke arms 415a, 415b, the location where the projections 414d are arranged on the first flange 414b easily deforms toward the coil 413, making it possible to inhibit abrasion of the tips of the projections 414d by the first yoke arm 415a.

Of the four concave portions 415f, the plate side concave portions 415f1 are positioned to the outside of the first through-hole 415d in the direction Y. As a result, when the spool 414 is inserted between the yoke arms 451a, 415b, the projections 414d that fit into the plate side concave portions 415f1 are able to reach the plate side concave portions 415f1 while avoiding the first through-hole 415d, making it possible to prevent abrasion of the projections 414d by an edge of the first through-hole 415d.

The four concave portions 415f are shifted in the direction Y. As a result, when the spool 414 is inserted between the yoke arms 451a, 415b, the projections 414d that fit into the plate side concave portions 415f1 are able to reach the plate side concave portions 415f1 while avoiding the yoke opening side concave portions 415f2, making it possible to prevent abrasion of the projections 414d by edges of the yoke opening side concave portions 415f2.

The yoke opening side concave portions 415f2 are positioned to the inside of the plate side concave portions 415f1 in the direction Y. As a result, a tip of the yoke 415 can easily be made narrower.

Because the projections 414d are accommodated in the concave portions 415f, the movement of the spool 414 in the radial direction of the spool 414 is restricted, making it possible to prevent the spool 414 and the coil 413 from vibrating in the radial direction of the spool. Furthermore, because the projections 414d plastically deform and are partially accommodated in the concave portions 415f, the movement of the spool 414 in the radial direction of the spool is reliably restricted.

Because the inner circumferential surfaces of the concave portions 415f and the outer circumferential surfaces of the projections 414d are in contact, the movement of the spool 414 in the axial direction X of the spool is inhibited by frictional resistance at the points of contact, making it possible to inhibit vibrating of the spool 414 and the coil 413 in the axial direction X of the spool.

In the portions of the projections 414d that are positioned outside the concave portions 415f and are pressed by the yoke 415, that is, in the portions that are subject to a compressive load, deformation occurs due to creep, and temperature changes tend to cause a gap to open up between the spool 414 and the yoke 415. However, the portions of the projections 414d that are inside the concave portions 415f tend not to be subject to a compressive load, and dimensional changes due to creep tend not to occur, so it is possible for the outer circumferential surfaces of the projections 414d and the inner circumferential surfaces of the concave portions 415f to remain continuously in a contact state. Moreover, the difference in the linear expansion coefficients of the resin spool 414 and the metal yoke 415 means that the amount of dimensional change between the projections 414d due to a change in temperature will be different from the amount of dimensional change between the concave portions 415f. Therefore, the contact state is maintained between all locations on the outer circumferential surfaces of the projections 414d and the inner circumferential surfaces of the concave portions 415f, regardless of the temperature.

Because the projections 414d are formed as integral parts of the spool 414, they can be implemented with almost no increase in cost. And because the concave portions 415f can be formed at the same time that the yoke 415 is press-formed, they can also be implemented with almost no increase in cost.

Because the positions of the four projections 414d are aligned with the positions of the four concave portions 415f when the spool 414 is inserted to a position where the cylindrical portion 414a of the spool 414 is approximately coaxial with the first and second through-holes 415d, 415e of the yoke 415, when the driving portion is in its completed state, the axial centers of the cylindrical portion 414a and the first and second through-holes 415d, 415e are precisely aligned. Therefore, the assembly of the driving portion into the valve is easy.

Second Embodiment

Figure 7:
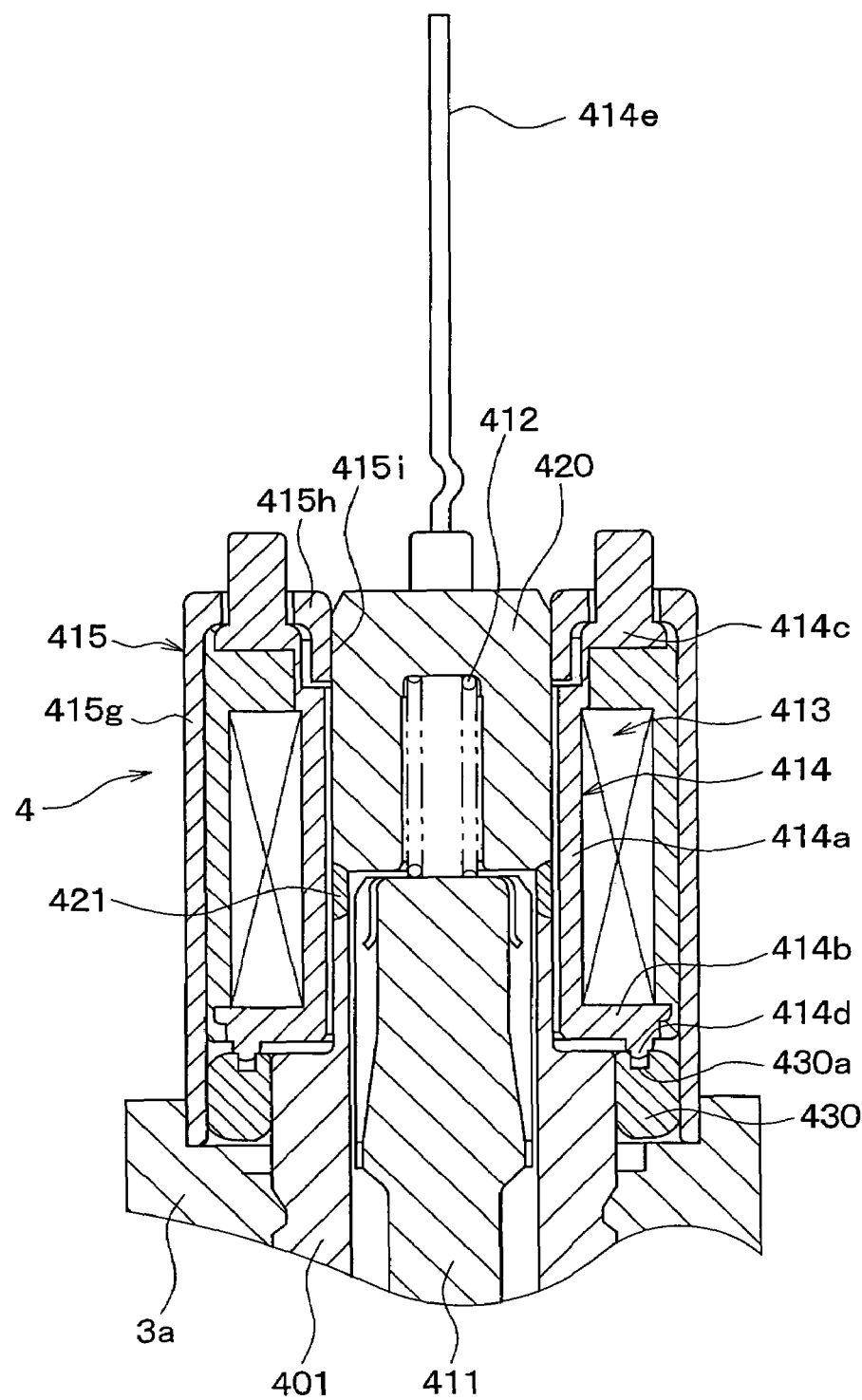
FIG. 7 is a cross sectional view showing an electromagnetic valve of a second embodiment of the present invention in its assembled state inside an actuator housing.

A second embodiment of the present invention will be explained. FIG. 7 is a cross sectional view that shows an electromagnetic valve in accordance with a second embodiment of the present invention in its assembled state inside an actuator housing.

In the first embodiment, a yoke 415 in the shape of a square letter C was used, but in this embodiment, a cylindrical yoke 415 is used. Note that for portions that are the same as or equivalent to those in the first embodiment, the same reference numerals are used and explanations are omitted.

As shown in FIG. 7, a valve portion of an electromagnetic valve 4 includes a guide 401, a plunger 411 that slides within the guide 401, a spring 412 that urges the plunger 411, a stator core 420, and the like. The stator core 420 is made of a magnetic metal that is formed into a circular cylindrical shape with a bottom. The guide 401 and the stator core 420 are welded together with an intervening member 421 made of non-magnetic metal interposed therebetween. After the component parts of the valve portion is integrated with the element including the guide 401, the stator core 420, the plunger 411, the spring 412, and the like, and, thereafter, it is press-fitted into a housing 3a and fixed.

A driving portion of the electromagnetic valve 4 includes a coil 413, a spool 414, a yoke 415, a circular plate 430, and the like. The circular plate 430 is made of a magnetic metal and is provided with cylindrical concave portions 430a, into which projections 414d of the spool 414 are inserted. Note that the circular plate 430 forms a magnetic path together with the yoke 415. Thus, the yoke 415 and the circular plate 430 constitute a magnetic path member of the present invention.

The yoke 415 includes a cylindrical portion 415g and a flange 415h that extends inward in the radial direction from the end of the cylindrical portion 415g that is away from the housing 3a. A through-hole 415i, into which the stator core 420 is inserted, is provided in the center of the flange 415h.

After the coil 413 and the spool 414 are inserted into the yoke 415, the circular plate 430 is press-fitted into an opening in the yoke 415 at the end toward the housing. Therefore, the coil 413, the spool 414, the yoke 415, and the circular plate 430 are integrated into a single unit and configured to the driving portion.

When the circular plate 430 is press-fitted into the yoke 415, the positions of the projections 414d of the spool 414 and the concave portions 430a of the circular plate 430 are aligned, so that press-fitting the circular plate 430 to a prescribed position causes the projections 414d to touch edges of the concave portions 430a and plastically deform, fitting the projections 414d into the concave portions 430a.

In this embodiment, because the projections 414d are accommodated in the concave portions 430a, the movement of the spool 414 in the radial direction of the spool is restricted, making it possible to prevent the spool 414 and the coil 413 from vibrating in the radial direction of the spool. Furthermore, because the projections 414d plastically deform and are partially accommodated in the concave portions 430a, the movement of the spool 414 in the radial direction of the spool 414 is reliably restricted.

Because the inner circumferential surfaces of the concave portions 430a and the outer circumferential surfaces of the projections 414d are in contact, the movement of the spool 414 in the axial direction X of the spool is inhibited by frictional resistance at the points of contact, making it possible to inhibit shaking of the spool 414 and the coil 413 in the axial direction X of the spool.

The portions of the projections 414d that are inside the concave portions 430a tend not to be subject to a compressive load, and dimensional changes due to creep tend not to occur, so it is possible for the outer circumferential surfaces of the projections 414d and the inner circumferential surfaces of the concave portions 430a to remain continuously the contact state. Moreover, the difference in the linear expansion coefficients of the resin spool 414 and the metal circular plate 430 means that the amount of dimensional change between the projections 414d will be different from the amount of dimensional change between the concave portions 430a. Therefore, the contact state is maintained between portions of the outer circumferential surfaces of the projections 414d and portions of the inner circumferential surfaces of the concave portions 430a.

Third Embodiment

Figure 8:
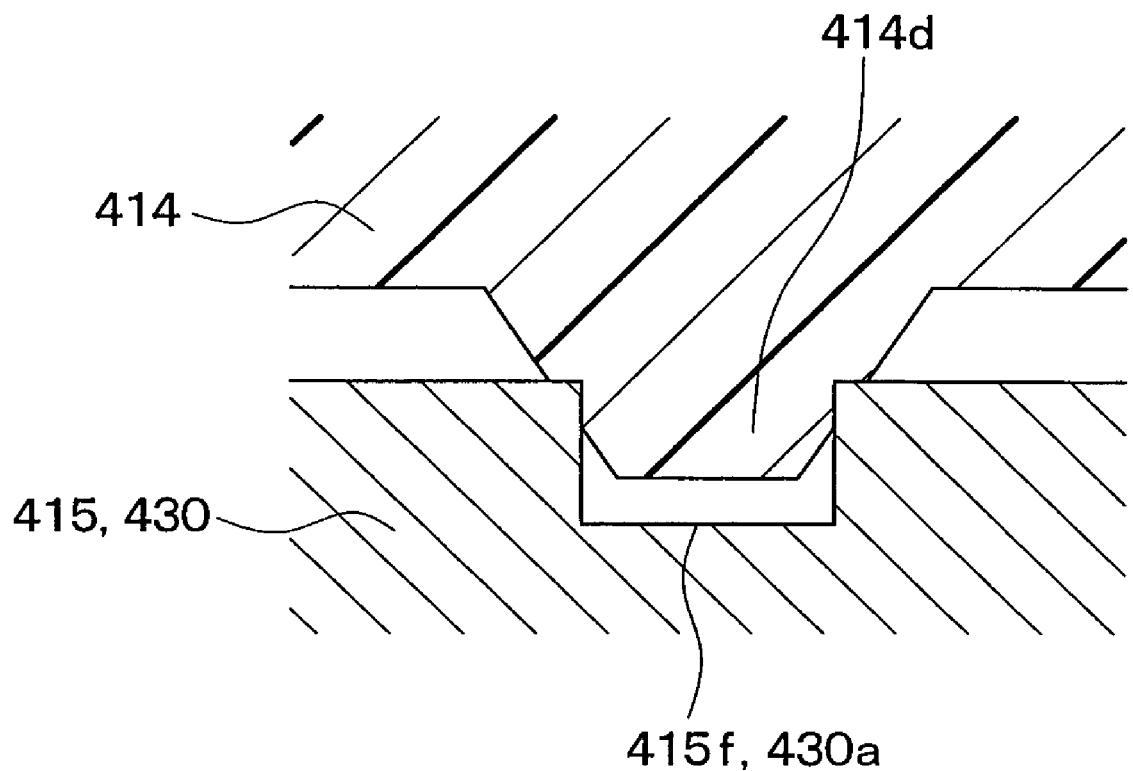
FIG. 8 is a cross sectional view of a location where a projection of a spool in an electromagnetic valve in accordance with a third embodiment of the present invention is fitted into a recessed portion of a yoke or a circular plate.

A third embodiment of the present invention will be explained. FIG. 8 is a cross sectional view of a location where a projection of a spool in an electromagnetic valve in accordance with the third embodiment of the present invention is fitted into a recessed portion of a yoke or a circular plate.

In each of the preceding embodiments, the projections 414d are spherical, but in this embodiment, as shown in FIG. 8, projections 414d are formed in circular cones in which the diameters thereof become smaller toward tips. The outside diameter of the largest-diameter portion of each of the projections 414d is larger than the inside diameter of the concave portions 415f, 430a in the yoke 415 or the circular plate 430, and the diameter of the tip of each of the projections 414d is smaller than the inside diameter of the concave portions 415f, 430a. As a result, the projections 414d plastically deform and are partially accommodated in the concave portions 415f, 430a.

Other Embodiments

In each of the preceding embodiments, the projections 414d plastically deform and are partially accommodated in the concave portions 415f, 430a, but for example, projections 414d may be cylinders with diameters only slightly larger than the inside diameters of concave portions 415f, 430a, such that the projections 414d may be press-fitted into the concave portions 415f, 430a without plastically deformation. In other words, so long as outer circumferential surfaces of the projections 414d are in contact with inner circumferential surfaces of the concave portions 415f, 430a, vibrating can be inhibited even without achieving a state of plastic deformation.

Also, in each of the preceding embodiments, plural projections 414d are provided, but there may also be only one projection 414d.

While the above description is of the preferred embodiments of the present invention, it should be appreciated that the invention may be modified, altered, or varied without deviating from the scope and fair meaning of the following claims.

What is claimed is:

1. An electromagnetic valve, comprising:
    a resin spool having a cylindrical portion and a flange that extends outward in the radial direction from an end of the cylindrical portion;
    a coil, which is wound around the spool, for forming a magnetic field when electric power is supplied; and
    a metal magnetic path member encircling the spool and the coil and forming a magnetic path, wherein
    plurality of projections are provided on the flange on an axial-direction end face of the spool;
    plurality of concave portions are provided on the magnetic path member in a position that faces the plurality of projections; and
    the plurality of projections are accommodated in the plurality of concave portions such that an outer circumferential surface of the plurality of projections touches an inner circumferential surface of the plurality of concave portions.

2. The electromagnetic valve according to claim 1, wherein a portion of each of the plurality of projections plastically deforms and is fitted into each of the plurality of concave portions.

3. The electromagnetic valve according to claim 2, wherein each of the plurality of concave portions is a cylindrical hole, each of the plurality of concave portions is shaped so that a diameter thereof becomes smaller toward a tip thereof, and an outside diameter of a largest-diameter portion of each of the plurality of projections is larger than an inside diameter of each of the plurality of concave portions.

4. The electromagnetic valve according to claim 3, wherein each of the plurality of projections is spherical.

5. The electromagnetic valve according to claim 3, wherein each of the plurality of projections is a truncated circular cone.

6. The electromagnetic valve according to claim 1, wherein
    the magnetic path member is a yoke shaped into a square letter C when viewed from the radial direction of the spool;
    the yoke is provided with two parallel yoke arms, which are positioned at both ends of the spool in the axial direction of the spool and sandwich the spool, and a yoke side plate for connecting the two yoke arms;
    the yoke is structured such that the spool is inserted into an opening in the yoke that is on an opposite side of the yoke from the yoke side plate toward the yoke side plate and is sandwiched between the two yoke arms;
    the two yoke arms are provided with through-holes that are coaxial with the cylindrical portion; and
    at least one of the two yoke arms is provided with at least one of said plurality of concave portions.

7. The electromagnetic valve according to claim 6, wherein at least a portion of each of plurality of projections is positioned at a location in the flange that is farther outside in a radial direction of the spool than an outermost perimeter of the coil.

8. The electromagnetic valve according to claim 6, wherein each of the plurality of concave portions is positioned to the outside of the through-hole in a direction that is orthogonal to both a spool insertion direction and an axial direction of the spool.

9. The electromagnetic valve according to claim 8, wherein each of the plurality of concave portions that is positioned closer to the yoke side plate than a center of the through-hole is positioned at the outside of the through-hole in a direction that is orthogonal to both the spool insertion direction and the axial direction of the spool.

10. The electromagnetic valve according to claim 6, wherein
    said plurality of concave portions are provided along the spool insertion direction; and
    respective positions of the plurality of concave portions are offset in a direction that is orthogonal to both the spool insertion direction and the axial direction of the spool.

11. The electromagnetic valve according to claim 10, wherein the each of the plurality of concave portions on an opening side of the yoke are positioned to the inside of the plurality of concave portions on the side of the yoke side plate in a direction that is orthogonal to both the spool insertion direction and the axial direction of the spool.

12. The electromagnetic valve according to claim 1, wherein,
    the magnetic path member includes a cylindrical yoke and a circular plate that is press-fitted into an opening of the yoke; and
    each of the plurality of concave portions is provided in the circular plate.

* * * * *